US010877561B2

(12) United States Patent
Danieau et al.

(10) Patent No.: US 10,877,561 B2
(45) Date of Patent: Dec. 29, 2020

(54) HAPTIC IMMERSIVE DEVICE WITH TOUCH SURFACES FOR VIRTUAL OBJECT CREATION

(71) Applicant: InterDigital CE Patent Holdings, Paris (FR)

(72) Inventors: Fabien Danieau, Rennes (FR); Antoine Costes, Rennes (FR); Edouard Callens, Maroeuil (FR); Philippe Guillotel, Vern sur Seiche (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 25 days.

(21) Appl. No.: 16/108,314

(22) Filed: Aug. 22, 2018

(65) Prior Publication Data
US 2019/0064926 A1     Feb. 28, 2019

(30) Foreign Application Priority Data
Aug. 22, 2017   (EP) ..................................... 17306087

(51) Int. Cl.
| G06F 3/01 | (2006.01) |
| G06K 9/62 | (2006.01) |
| G06T 17/20 | (2006.01) |
| G06F 3/041 | (2006.01) |
| G06F 3/0354 | (2013.01) |

(52) U.S. Cl.
CPC .......... *G06F 3/016* (2013.01); *G06F 3/03547* (2013.01); *G06F 3/0414* (2013.01); *G06K 9/6215* (2013.01); *G06T 17/20* (2013.01); *G06F 2203/04809* (2013.01)

(58) Field of Classification Search
CPC .... G06F 3/016; G06F 3/03547; G06F 3/0414; G06F 2203/04809; G06T 17/20; G06K 9/6215
See application file for complete search history.

(56) References Cited

U.S. PATENT DOCUMENTS

| 7,710,415 | B2 | 5/2010 | Jennings, Jr. et al. |
| 8,456,484 | B2 | 6/2013 | Berger et al. |
| 2008/0024459 | A1* | 1/2008 | Poupyrev ................ G06F 3/016 345/173 |
| 2010/0141407 | A1 | 6/2010 | Heubel et al. |

(Continued)

FOREIGN PATENT DOCUMENTS

| KR | 20170109288 | 9/2017 |
| WO | WO 2017139509 A1 A1 | 8/2017 |

OTHER PUBLICATIONS

Liu et al., "Cyber Surgery: Parameterized Mesh for Multi-modal Surgery Simulation," Journal of Visualization, vol. 9, No. 4, Dec. 2006, pp. 373-380.

(Continued)

*Primary Examiner* — Muhammad N Edun
(74) *Attorney, Agent, or Firm* — Lily Neff

(57) ABSTRACT

An apparatus and method is provided in which pressure sensors are disposed in a configuration such as a matrix format on the surface of the user input device. The processor generates a proxy on the image having a plurality of points disposed in a corresponding configuration. The proxy points are associated with each pressure sensor locations. The processor then generates an output effect responsive to input signal received from one or more pressure sensors of the input device.

17 Claims, 15 Drawing Sheets

(56) References Cited

U.S. PATENT DOCUMENTS

| | | | | |
|---|---|---|---|---|
| 2012/0019448 | A1* | 1/2012 | Pitkanen | G06F 3/041 345/173 |
| 2014/0139448 | A1 | 5/2014 | Levesque et al. | |
| 2014/0362014 | A1* | 12/2014 | Ullrich | G06F 3/016 345/173 |
| 2015/0316986 | A1 | 11/2015 | Xue | |
| 2017/0038968 | A1 | 2/2017 | Tarrago et al. | |
| 2017/0153703 | A1* | 6/2017 | Yun | G06F 3/016 |
| 2018/0181200 | A1* | 6/2018 | Olien | G06F 3/016 |

OTHER PUBLICATIONS

Kohli et al., "Redirected Touching: The Effect of Warping Space on Task Performance," IEEE Symposium on 3D User Interfaces, Orange County, California, USA, Mar. 4, 2012, pp. 105-112.

Kohli, L., "Redirected Touching: Warping Space to Remap Passive Haptics", IEEE Symposium on 3D User Interfaces (3DUI 2010), Waltham, Massachusetts, USA, Mar. 20, 2010, pp. 129-130.

Yoshihiro. Watanabe et al., The deformable workspace: A membrane between real and virtual space. In Horizontal Interactive Human Computer Systems, 2008. TABLETOP 2008. 3rd IEEE International Workshop on IEEE, pp. 145-152.

Jose Saenz-Cogollo et al., "Pressure Mapping Mat for Tele-Home Care Applications," Sensors, vol. 16, No. 3, p. 365, Mar. 2016.

Adrian Freed, "Support Vector Machine Learning for Gesture Signal Estimation with a Piezo-Resistive Fabric Touch Surface," presented at the New Interfaces for Musical Expression, Sydney, Australia, 2010.

H. Ishii et al., "Bringing clay and sand into digital design—Continuous tangible user interfaces," BT Technology Journal, vol. 22. No. 4, pp. 287-299, Oct. 2004.

* cited by examiner

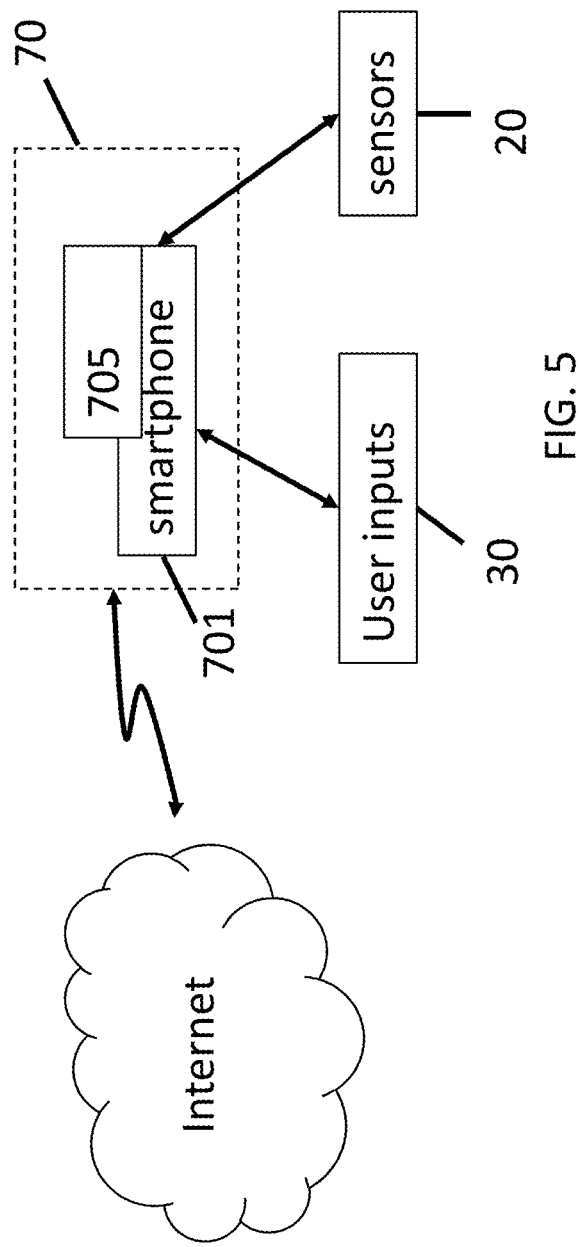
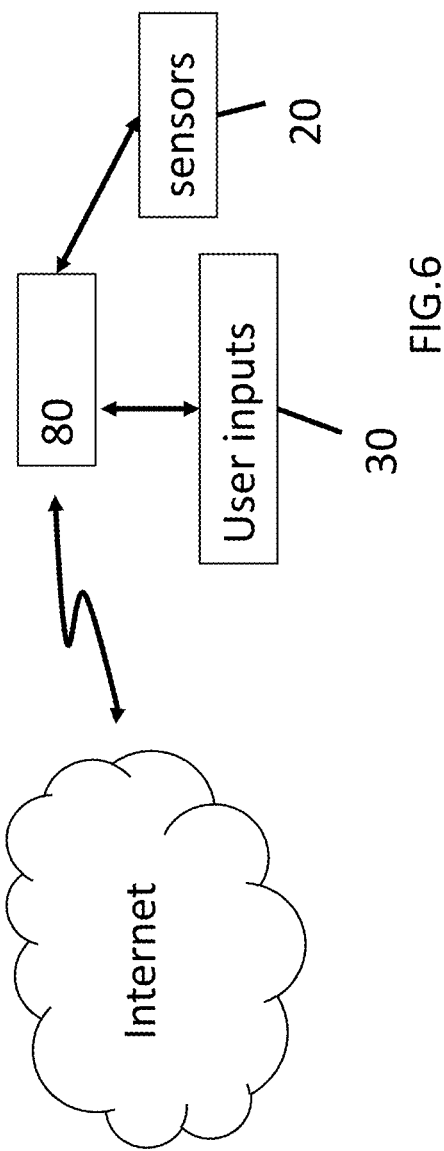

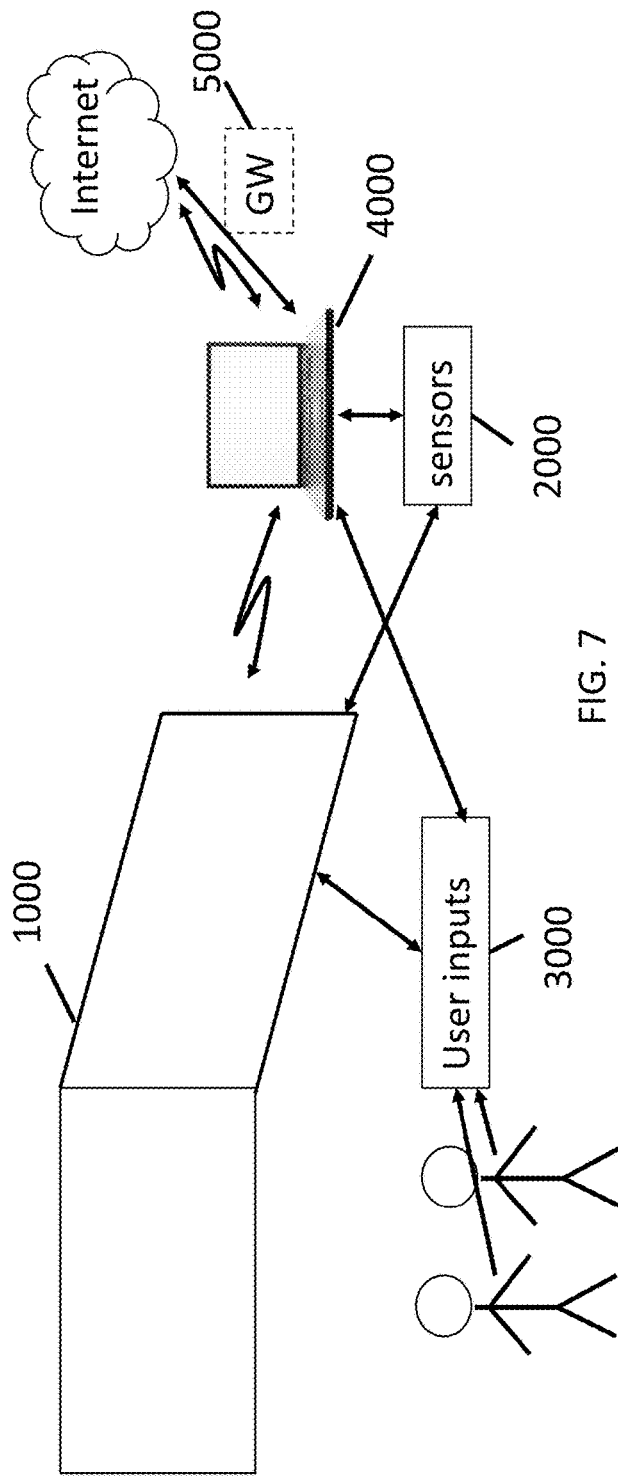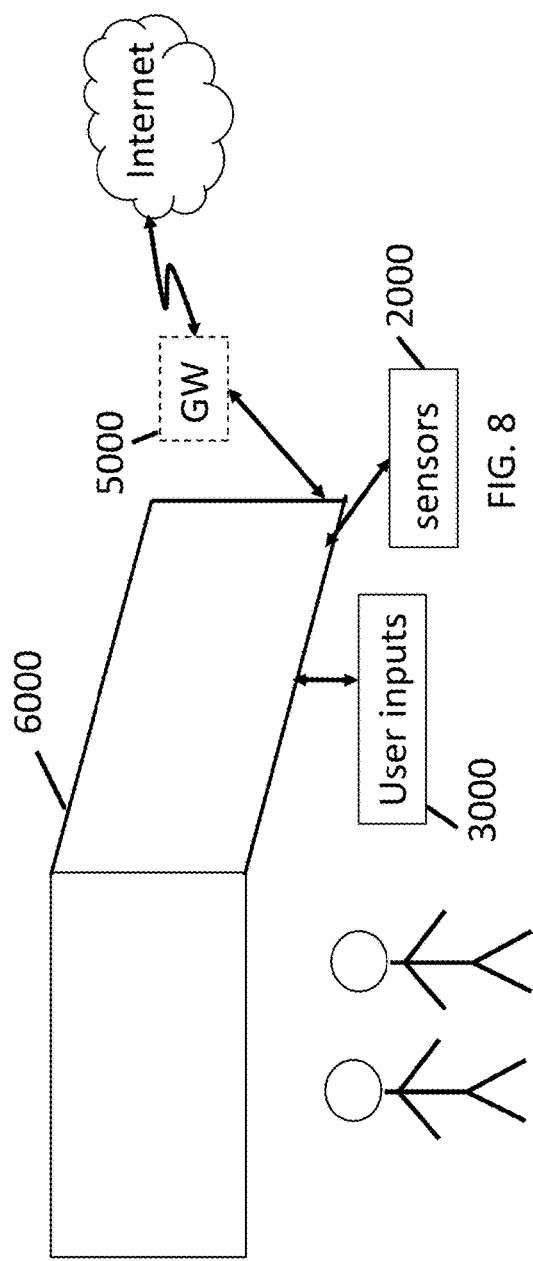

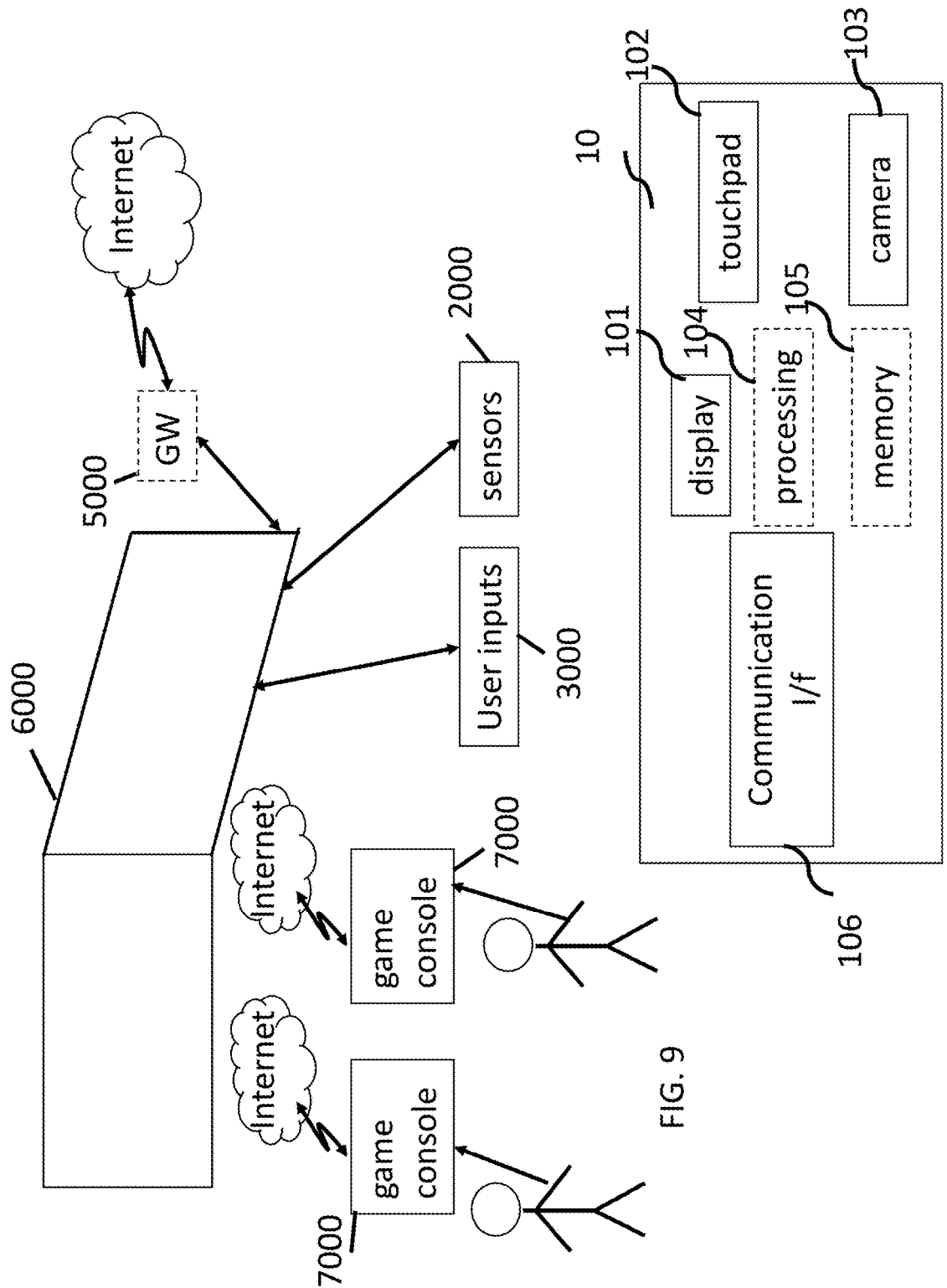

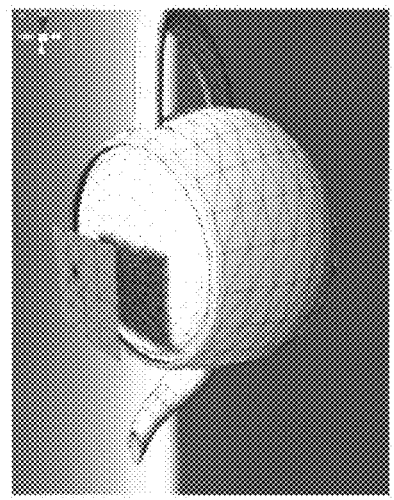
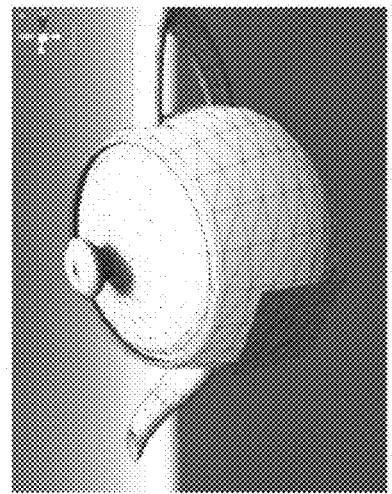
FIG. 14

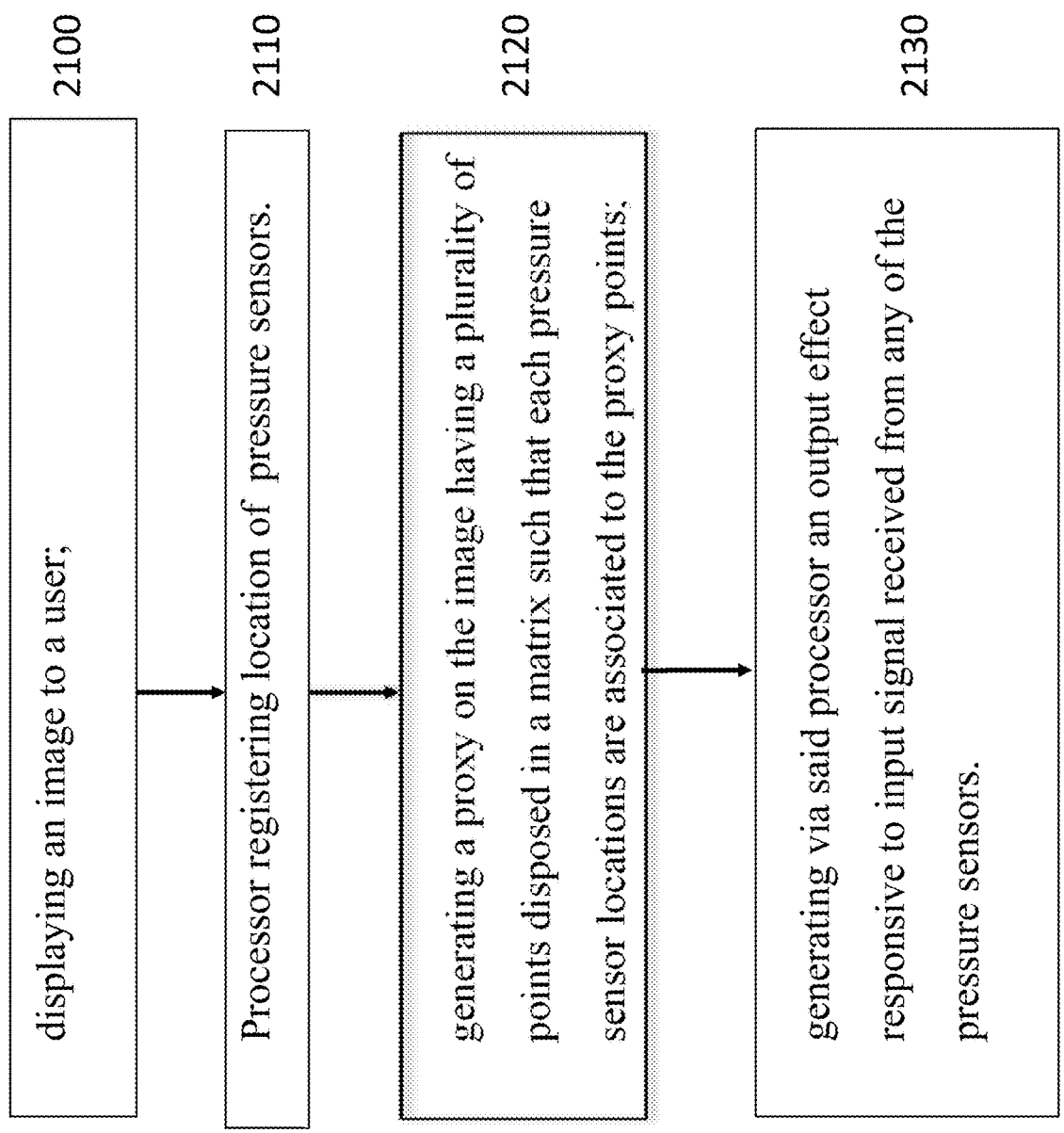

HAPTIC IMMERSIVE DEVICE WITH TOUCH SURFACES FOR VIRTUAL OBJECT CREATION

REFERENCE TO RELATED EUROPEAN APPLICATION

This application claims priority from European Patent Application No. 17306087.2, entitled, "HAPTIC IMMERSIVE DEVICE WITH TOUCH SURFACES FOR VIRTUAL OBJECT CREATION", filed on Aug. 22, 2017, the contents of which are hereby incorporated by reference in its entirety.

TECHNICAL FIELD

The present disclosure relates generally to devices that provide immersive experiences and in particular to a haptic device such as used in Virtual Reality (VR) or Augmented Reality (AR) environments to provide an immersive experience.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In recent years, improvements in technology had increased the popularity of devices that provide immersive experiences. Virtual Reality (VR) and Augmented Reality (AR) devices and applications have been very successful because they replicate virtual experiences. AR and VR devices provide stereoscopic techniques that transform two dimensional images into three dimensional contents. However, creating a complete immersive experience involves more than reproducing virtual images alone. Other components need to be incorporated into VR/AR environments that can realistically emulate other sensory stimuli. To this end, haptic devices have been implemented as part of VR/AR systems to help create a realistic sense of touch in these virtual environments.

Haptic technology has been incorporated in VR/AR applications but there are many limitations that prevent this technology to be used effectively. Consequently, improved solutions are desirable that can provide a more enhanced VR/AR experience by allowing the creation of carefully controlled haptic virtual objects, especially using Tangible User Interfaces (TUI).

SUMMARY

Additional features and advantages are realized through the techniques of the various embodiments, described in detail herein.

According to an aspect an apparatus is provided. The apparatus comprises one or more processors configured for generating on an image for display to a user a proxy having a plurality of points disposed in a configuration, for example a matrix format. The proxy points are associated with locations of pressure sensors on an input device. The processor generates an output effect responsive to input signal received from one or more of the pressure sensors of the input device. In an embodiment the apparatus comprises means for registering locations of the plurality of pressure sensors. In an embodiment an input device is provided comprising pressure sensors disposed in a configuration, for example a matrix format, on the surface of the input device. The input device may be an electromechanical input device. The pressure sensors may be provided on at least one surface of the input device. In an embodiment the at least one surface is a deformable mesh.

According to another aspect a method is provided. The method comprises generating on an image for display to a user, a proxy having a plurality of points disposed in a configuration such that the proxy points correspond to locations of pressure sensors on an input device, generating an output effect responsive to input signal received from one or more of the pressure sensors of the input device. In an embodiment the locations of the plurality of pressure sensors is registered.

Another aspect provides a system comprising an apparatus according to any embodiment; and at least one of an input device having a plurality of pressure sensors disposed in a configuration on at least one surface and a display for displaying the image.

Embodiments of the invention may be provided in the form of software, hardware or a combination thereof. According to a general aspect of at least one embodiment, there is provided a computer program product comprising instructions which, when the program is executed by a computer, cause the computer to carry out any of the described embodiments.

BRIEF DESCRIPTION OF THE DRAWINGS

The present disclosure will be better understood and illustrated by means of the following embodiment and execution examples, in no way limitative, with reference to the appended figures on which:

FIG. 5 schematically represents a system, according to another embodiment;

FIG. 6 schematically represents a system, according to another embodiment

FIG. 7 schematically represents a system, according to another embodiment;

FIG. 8 schematically represents a system according to another embodiment,

FIG. 9 schematically represents a system according to another embodiment,

FIG. 10 schematically represents an immersive video rendering device according to an embodiment, FIG. 11 schematically represents an immersive video rendering device according to another embodiment, FIG. 12 schematically represents an immersive video rendering device according to another embodiment, FIG. 13 schematically represents an exemplary view of a haptic device according to one embodiment;

FIG. 14 schematically represents a proxy provided on an image according to the embodiment of FIG. 13;

FIG. 21 is a flow chart representation of a methodology according to one embodiment.

Wherever possible, the same reference numerals will be used throughout the figures to refer to the same or like parts.

DESCRIPTION

It is to be understood that the figures and descriptions of the present disclosure have been simplified to illustrate elements that are relevant for a clear understanding of embodiments, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

In recent years, the popularity of systems that create immersive experiences have been greatly increased. AR/VR technology has been used in many instances to replicate virtual environments that provide the feel of a real world. However, the creation of immersive experiences is not limited to VR/AR experiences. Movie theaters and even home entertainment units can be used to also provide similar immersive environments. One component of creating a virtual environment that feels real is to engage multisensory components in delivery of the experiences. Stereoscopic glasses and heat mounted equipment easily render two dimensional images into three dimensional objects and surround sound systems can provide a realistic auditory experience. Even scents can easily be recreated by spraying chemicals at appropriate intervals. Recreation of an appropriate sense of touch, however, is a more challenging task. In one embodiment of the present invention, in order to recreate a sense of touch in a multisensory immersive environment, a system that incorporates haptic devices can be utilized. Such a system can use haptic devices and/or component(s) in appropriate application of forces and vibrations that are in correspondence in creating realistic immersive experience for the user. This sense of touch when incorporated with virtual imagery can be transformative in making the user believe that a near reality experience has been created. Haptic devices can rely on a combination of electrical and mechanical stimulation to assist in the creation of virtual objects and in tricking the mind that such computer or virtual simulations are controlled by the user. Haptic devices may incorporate sensors, such as tactile sensors that measure forces exerted by the user on the interface to control the virtual objects.

Figure 1:
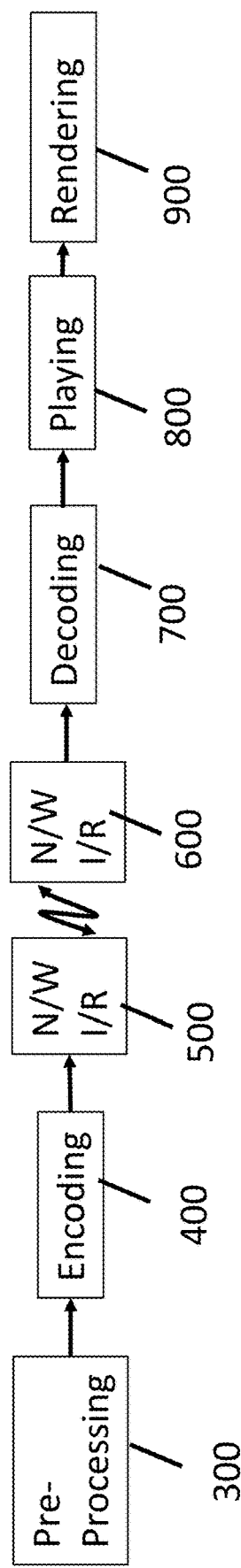
FIG. 1 schematically represents a functional overview of an encoding and decoding system according one or more embodiments of the disclosure.

FIG. 1 schematically illustrates a general overview of an encoding and decoding system according to one or more embodiments. The system of FIG. 1 is configured to perform one or more functions. A pre-processing module 300 may be provided to prepare the content for encoding by an encoding device 400. The pre-processing module 300 may perform multi-image acquisition, merging of the acquired multiple images in a common space (typically a 3D sphere if, directions are encoded), and mapping of the 3D sphere into a 2D frame using, for example, but not limited to, an equirectangular mapping or a cube mapping. The pre-processing module 300 may also acquire an omnidirectional video in a particular format (for example, equi-rectangular) as input, and pre-process the video to change the mapping into a format more suitable for encoding. Depending on the acquired video data representation, the pre-processing module 300 may perform a mapping space change. After being encoded, the data, which may be encoded immersive video data or 3D CGI encoded data for instance, are sent to a network interface 500, which may be typically implemented in any network interface, for instance present in a gateway. The data are then transmitted through a communication network, such as internet but any other network may be foreseen. Then the data are received via network interface 600. Network interface 600 may be implemented in a gateway, in a television, in a set-top box, in a head mounted display device, in an immersive (projective) wall or in any immersive video rendering device. After reception, the data are sent to a decoding device 700. Decoded data are then processed by a player 800. Player 800 prepares the data for the rendering device 900 and may receive external data from sensors or users input data. More precisely, the player 800 prepares the part of the video content that is going to be displayed by the rendering device 900. The decoding device 700 and the player 800 may be integrated in a single device (e.g., a smartphone, a game console, a STB, a tablet, a computer, etc.). In another embodiment, the player 800 may be integrated in the rendering device 900.

Various types of systems may be used to perform functions of an immersive display device, for rendering an immersive video for example decoding, playing and rendering. Embodiments of a system, for processing augmented reality (AR) or virtual reality (VR) content are illustrated in FIGS. 2 to 9. Such systems are provided with one or more processing functions, and include an immersive video rendering device which may be a head-mounted display (HMD), a tablet or a smartphone for example, and optionally include one or sensors. The immersive video rendering device may also include, interface modules between the display device and one or more modules performing the processing functions. The processing functions maybe integrated into the immersive video rendering device or performed by one or more processing devices. Such a processing device may include one or more processors and a communication interface with the immersive video rendering device, such as a wireless or wired communication interface.

The processing device may also include a communication interface with a wide access network such as internet and access content located on a cloud, directly or through a network device such as a home or a local gateway. The processing device may also access a local storage device through an interface such as a local access network interface, for example an Ethernet type interface. In an embodiment, the processing device may be provided in a computer system having one or more processing units. In another embodiment, the processing device may be provided in a smartphone which can be connected by a wired link or a wireless link to the video to change the mapping into a format more suitable for encoding. Depending on the acquired video data representation, the pre-processing module 300 may perform a mapping space change. After being encoded, the data, which may be encoded immersive video data or 3D CGI encoded data for instance, are sent to a network interface 500, which may be typically implemented in any network interface, for instance present in a gateway. The data are then transmitted through a communication network, such as internet but any other network may be foreseen. Then the data are received via network interface 600. Network interface 600 may be implemented in a gateway, in a television, in a set-top box, in a head mounted display device, in an immersive (projective) wall or in any immersive video rendering device. After reception, the data are sent to a decoding device 700. Decoded data are then processed by a player 800. Player 800 prepares the data for the rendering device 900 and may receive external data from sensors or users input data. More precisely, the player 800 prepares the part of the video content that is going to be displayed by the rendering device 900. The decoding device 700 and the player 800 may be integrated in a single device (e.g., a smartphone, a game console, a STB, a tablet, a computer, etc.). In an embodiment, the player 800 may be integrated in the rendering device 900.

An immersive content typically refers to a video or other streamed content or images, potentially encoded on a rectangular frame that is a two-dimension array of pixels (i.e. element of color information) like a "regular" video or other form of image content. In many implementations, the following processes may be performed. To be rendered, the frame is, first, mapped on the inner face of a convex volume, also referred to as mapping surface (e.g. a sphere, a cube, a pyramid), and, second, a part of this volume is captured by a virtual camera. Images captured by the virtual camera are rendered on the screen of the immersive display device. A stereoscopic video is encoded on one or two rectangular frames, projected on two mapping surfaces which are combined to be captured by two virtual cameras according to the characteristics of the device.

Pixels may be encoded according to a mapping function in the frame. The mapping function may depend on the mapping surface. For a same mapping surface, various mapping functions are possible. For example, the faces of a cube may be structured according to different layouts within the frame surface. A sphere may be mapped according to an equirectangular projection or to a gnomonic projection for example. The organization of pixels resulting from the selected projection function modifies or breaks lines continuities, orthonormal local frame, pixel densities and introduces periodicity in time and space. These are typical features that are used to encode and decode videos. There is a lack of taking specificities of immersive videos into account in encoding and decoding methods. Indeed, as immersive videos are 360° videos, a panning, for example, introduces motion and discontinuities that require a large amount of data to be encoded while the content of the scene does not change. Taking immersive videos specificities into account while encoding and decoding video frames would bring valuable advantages to the state-of-art methods.

In another embodiment, the system includes an auxiliary device which communicates with the immersive video rendering device and with the processing device. In such an embodiment, the auxiliary device may perform at least one of the processing functions. The immersive video rendering device may include one or more displays. The device may employ optics such as lenses in front of each display. The display may also be a part of the immersive display device such as for example in the case of smartphones or tablets. In another embodiment, displays and optics may be embedded in a helmet, in glasses, or in a wearable visor. The immersive video rendering device may also include one or more sensors, as described later. The immersive video rendering device may also include interfaces or connectors. It may include one or more wireless modules in order to communicate with sensors, processing functions, handheld or devices or sensors related to other body parts.

When the processing functions are performed by the immersive video rendering device, the immersive video rendering device can be provided with an interface to a network directly or through a gateway to receive and/or transmit content.

The immersive video rendering device may also include processing functions executed by one or more processors and configured to decode content or to process content. By processing content here, it is understood functions for preparing content for display. This may include, for instance, decoding content, merging content before displaying it and modifying the content according to the display device.

One function of an immersive content rendering device is to control a virtual camera which captures at least a part of the content structured as a virtual volume. The system may include one or more pose tracking sensors which totally or partially track the user's pose, for example, the pose of the user's head, in order to process the pose of the virtual camera. One or more positioning sensors may be provided to track the displacement of the user. The system may also include other sensors related to the environment for example to measure lighting, temperature or sound conditions. Such sensors may also be related to the body of a user, for instance, to detect or measure sweating or heart rate. Information acquired through these sensors may be used to process the content. The system may also include user input devices (e.g. a mouse, a keyboard, a remote control, a joystick). Information from user input devices may be used to process the content, manage user interfaces or to control the pose of the virtual camera. Sensors and user input devices communicate with the processing device and/or with the immersive rendering device through wired or wireless communication interfaces.

An embodiment of the immersive video rendering device 10, will be described in more detail with reference to FIG. 10. The immersive video rendering device includes a display 101. The display is, for example an OLED or LCD type display. The immersive video rendering device 10 is, for instance a HMD, a tablet or a smartphone. The device 10 may include a touch sensitive surface 102 (e.g. a touchpad or a tactile screen), a camera 103, a memory 105 in connection with at least one processor 104 and at least one communication interface 106. The at least one processor 104 processes the signals received from the sensor(s) 20. Some of the measurements from sensors are used to compute the pose of the device and to control the virtual camera. Sensors which may be used for pose-estimation include, for instance, gyroscopes, accelerometers or compasses. In more complex systems, a rig of cameras for example may also be used. The at least one processor 104 performs image processing to estimate the pose of the device 10. Some other measurements may be used to process the content according to environmental conditions or user reactions. Sensors used for detecting environment and user conditions include, for instance, one or more microphones, light sensor or contact sensors. More complex systems may also be used such as, for example, a video camera tracking eyes of a user. In such a case the at least one processor performs image processing to perform the expected measurement. Data from sensor(s) 20 and user input device(s) 30 may also be transmitted to the computer 40 which will process the data according to the input of the sensors.

Memory 105 includes parameters and code program instructions for the processor 104. Memory 105 may also include parameters received from the sensor(s) 20 and user input device(s) 30. Communication interface 106 enables the immersive video rendering device to communicate with the computer 40. The Communication interface 106 of the processing device may include a wireline interface (for example a bus interface, a wide area network interface, a local area network interface) or a wireless interface (such as a IEEE 802.11 interface or a Bluetooth® interface). Computer 40 sends data and optionally control commands to the immersive video rendering device 10. The computer 40 processes the data, for example to prepare the data for display by the immersive video rendering device 10. Processing may be carried out exclusively by the computer 40 or part of the processing may be carried out by the computer and part by the immersive video rendering device 10. The computer 40 is connected to internet, either directly or through a gateway or network interface 50. The computer 40 receives data representative of an immersive video from the internet, processes these data (for example. decode the data and may prepare the part of the video content that is going to be displayed by the immersive video rendering device 10) and sends the processed data to the immersive video rendering device 10 for display. In another embodiment, the system may also include local storage (not represented) where the data representative of an immersive video is stored, said local storage may be on the computer 40 or on a local server accessible through a local area network for instance (not represented).

Embodiments of a first type of system for displaying augmented reality, virtual reality, augmented virtuality or any content from augmented reality to virtual reality will be described with reference to FIGS. 2 to 6. In one embodiment, these are combined with a large field-of-view content that can provide a 360 degree view of a real, fictional or mixed environment. This large field-of-view content may be, among others, a three-dimension computer graphic imagery scene (3D CGI scene), a point cloud, streaming content or an immersive video or panoramic picture or images. Many terms may be used to define technology that provides such content or videos such as for example Virtual Reality (VR), Augmented Reality (AR) 360, panoramic, 4π, steradians, omnidirectional, immersive and alongside large-field-of-view as previously indicated.

Figure 2:
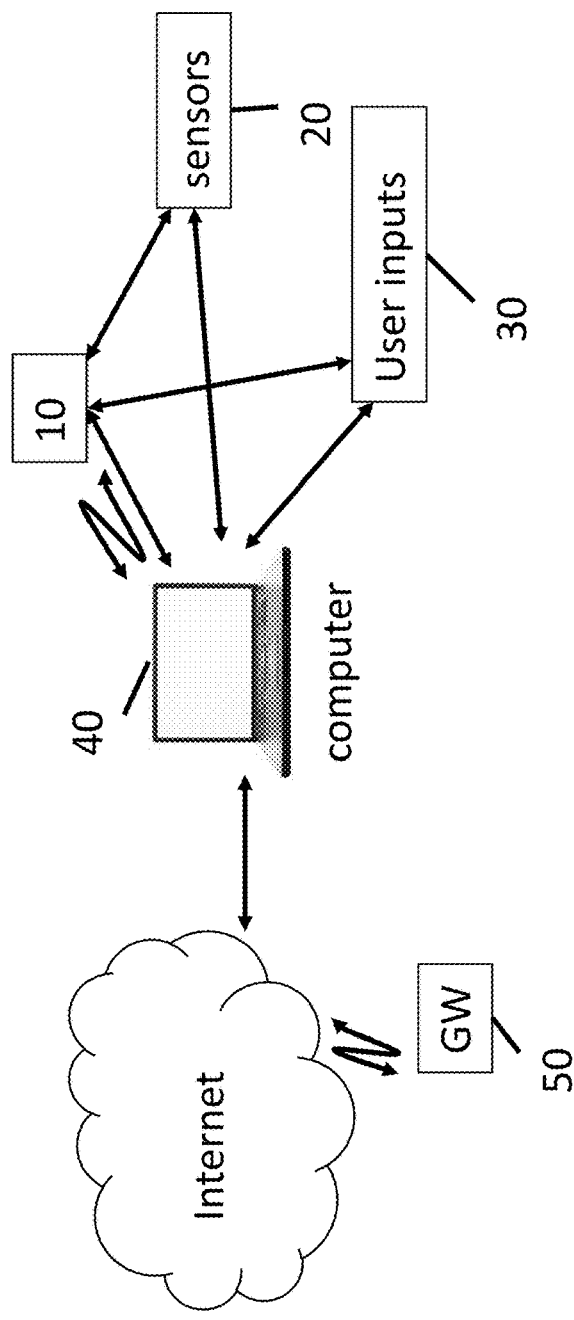
FIG. 2 schematically represents a system, according to one embodiment.

FIG. 2 schematically illustrates an embodiment of a system configured to decode, process and render immersive videos. The system includes an immersive video rendering device 10, one or sensors 20, one or more user input devices 30, a computer 40 and a gateway 50 (optional).

Figure 3:
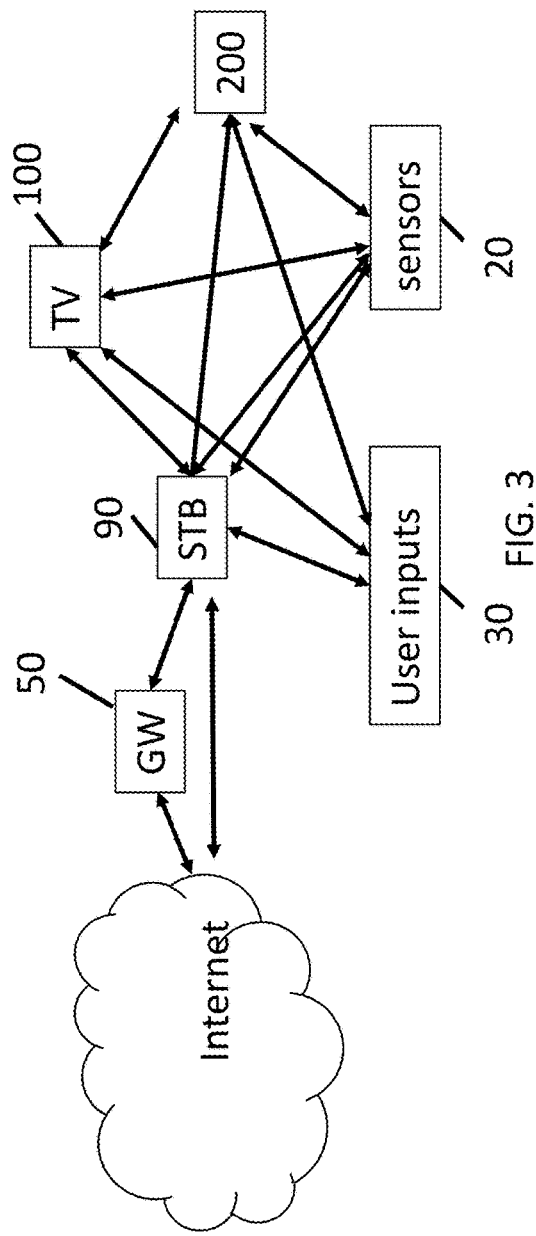
FIG. 3 schematically represents a system, according to another embodiment.

FIG. 3 schematically represents a second embodiment of a system configured to decode, process and render immersive videos. In this embodiment, a STB 90 is connected to a network such as internet directly (i.e. the STB 90 includes a network interface) or via a gateway 50. The STB 90 is connected through a wireless interface or through a wired interface to a rendering device such as a television set 100 or an immersive video rendering device 200. In addition to classic functions of a STB, STB 90 includes processing functions to process video content for rendering on the television 100 or on any immersive video rendering device 200. These processing functions are similar to the processing functions described for computer 40 and are not described again here. Sensor(s) 20 and user input device(s) 30 are also of the same type as the sensor(s) and input device(s) described earlier with reference to FIG. 2. The STB 90 obtains the data representative of the immersive video from the internet. In another embodiment, the STB 90 obtains the data representative of the immersive video from a local storage (not represented) where the data representative of the immersive video is stored.

Figure 4:
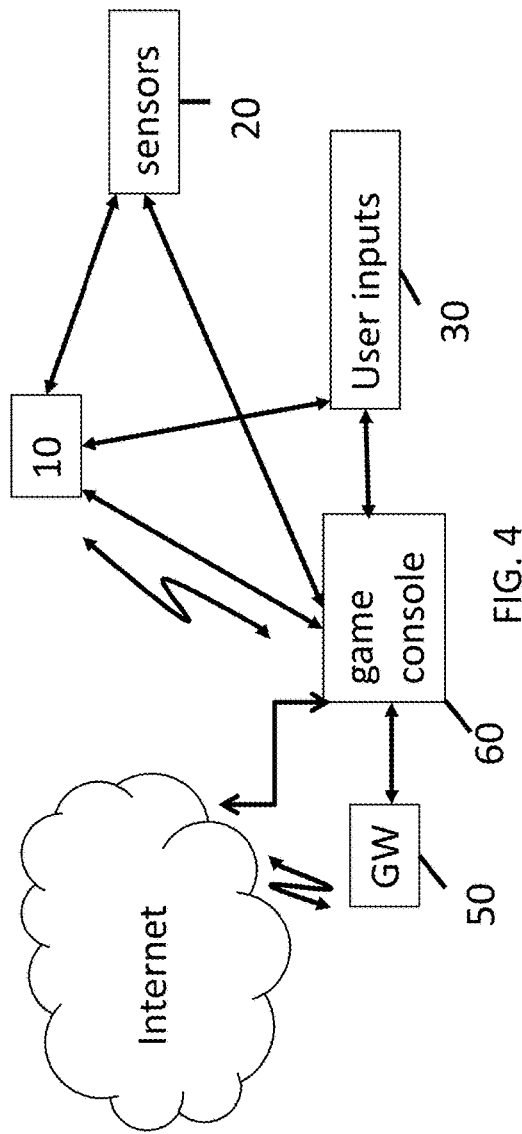
FIG. 4 schematically represents a system, according to another embodiment.

FIG. 4 schematically represents a third embodiment of a system configured to decode, process and render immersive videos. In the third embodiment a game console 60 processes the content data. Game console 60 sends data and optionally control commands to the immersive video rendering device 10. The game console 60 is configured to process data representative of an immersive video and to send the processed data to the immersive video rendering device 10 for display. Processing may be done exclusively by the game console 60 or part of the processing may be done by the immersive video rendering device 10.

The game console 60 is connected to internet, either directly or through a gateway or network interface 50. The game console 60 obtains the data representative of the immersive video from the internet. In another embodiment, the game console 60 obtains the rendering device 10. Processing may be carried out exclusively by the computer 40 or part of the processing may be carried out by the computer and part by the immersive video rendering device 10. The computer 40 is connected to internet, either directly or through a gateway or network interface 50. The computer 40 receives data representative of an immersive video from the internet, processes these data (for example. decode the data and may prepare the part of the video content that is going to be displayed by the immersive video rendering device 10) and sends the processed data to the immersive video rendering device 10 for display. In another embodiment, the system may also include local storage (not represented) where the data representative of an immersive video is stored, said local storage may be on the computer 40 or on a local server accessible through a local area network for instance (not represented).

FIG. 5 schematically represents a fourth embodiment of a system configured to decode, process and render immersive videos the immersive video rendering device 70 is provided by a smartphone 701 inserted in a housing 705. The smartphone 701 may be connected to internet and thus may obtain data representative of an immersive video from the internet. In another embodiment, the smartphone 701 obtains data representative of an immersive video from a local storage (not represented) where the data representative of an immersive video is stored, said local storage may be on the smartphone 701 or on a local server accessible through a local area network for instance (not represented).

Figure 11:
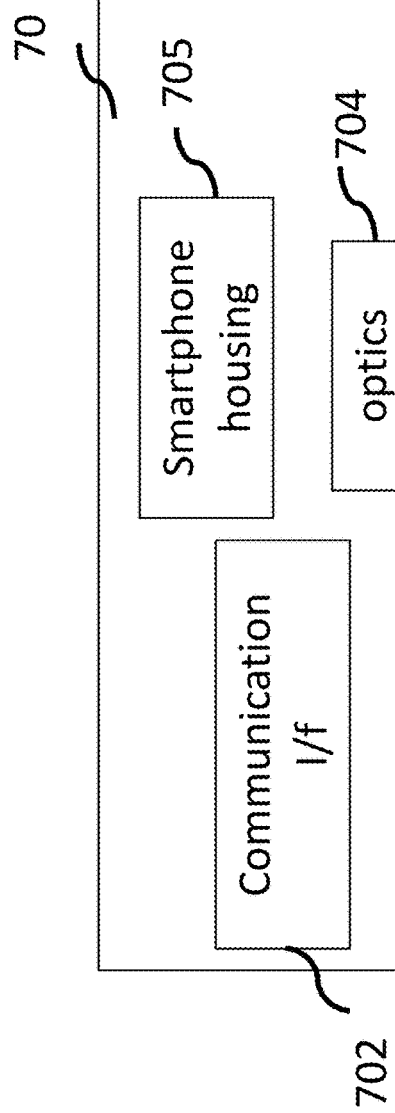

An embodiment of the immersive video rendering device 70 is described with reference to FIG. 11. The immersive video rendering device 70 optionally includes at least one network interface 702 and housing 705 for the smartphone 701. The smartphone 701 includes functions of a smartphone and a display. The display of the smartphone is used as the immersive video rendering device 70 display. Optics 704, such as lenses, may be included for viewing the data on the smartphone display. The smartphone 701 is configured to process (for example, decode and prepare for display) data representative of an immersive video for example according to data received from the sensors 20 and from user input devices 30. Some of the measurements from sensors may be used to compute the pose of the device and to control the virtual camera. Sensors which may be used for pose-estimation include, for instance, gyroscopes, accelerometers or compasses. More complex systems, for example a rig of cameras may also be used. In this case, the at least one processor performs image processing to estimate the pose of the device 10. Other measurements may be used to process the content according to environmental conditions or user reactions, for example. Sensors used for detecting environmental and user's conditions include, for instance, microphones, light sensor or contact sensors. More complex systems may also be used such as, for example, a video camera tracking eyes of a user. In such case the at least one processor performs image processing to perform the measurement.

FIG. 6 schematically represents a fifth embodiment of the first type of system in which the immersive video rendering device 80 includes functionalities for processing and displaying the data content. The system includes an immersive video rendering device 80, sensors 20 and user input devices 30. The immersive video rendering device 80 is configured to process (e.g. decode and prepare for display) data representative of an immersive video possibly according to data received from the sensors 20 and from the user input devices 30. The immersive video rendering device 80 may be connected to internet and thus may obtain data representative of an immersive video from the internet. In another embodiment, the immersive video rendering device 80 obtains data representative of an immersive video from a local storage (not represented) where the data representative of an immersive video is stored, said local storage may be provided on the rendering device 80 or on a local server accessible through a local area network for instance (not represented).

Figure 12:
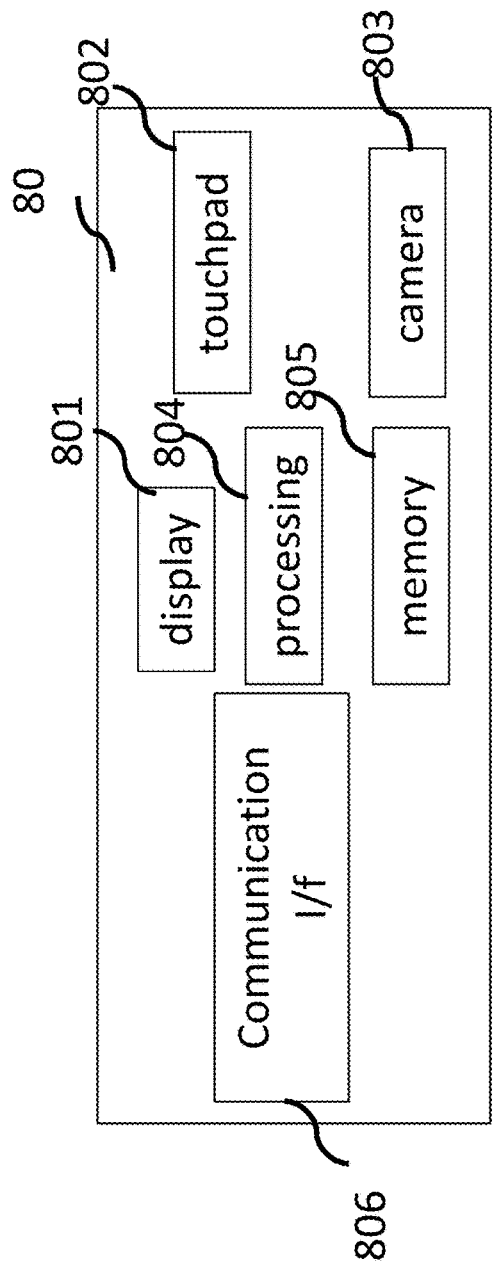

An embodiment of immersive video rendering device 80 is illustrated in FIG. 12. The immersive video rendering device includes a display 801, for example an OLED or LCD type display, a touchpad (optional) 802, a camera (optional) 803, a memory 805 in connection with at least one processor 804 and at least one communication interface 806. Memory 805 includes parameters and code program instructions for the processor 804. Memory 805 may also include parameters received from the sensors 20 and user input devices 30. Memory 805 may have a large enough capacity to store data representative of the immersive video content. Different types of memories may provide such a storage function and include one or more storage devices such as a SD card, a hard disk, a volatile or non-volatile memory . . . ) Communication interface 806 enables the immersive video rendering device to communicate with internet network. The processor 804 processes data representative of the video to display images on display 801. The camera 803 captures images of the environment for an image processing step. Data are extracted from this step to control the immersive video rendering device.

Embodiments of a second type of system, for processing augmented reality, virtual reality, or augmented virtuality content are illustrated in FIGS. 7 to 9. In these embodiments the system includes an immersive wall.

FIG. 7 schematically represents an embodiment of the second type of system including a display 1000—an immersive (projective) wall which receives data from a computer 4000. The computer 4000 may receive immersive video data from the internet. The computer 4000 can be connected to internet, either directly or through a gateway 5000 or network interface. In another embodiment, the immersive video data are obtained by the computer 4000 from a local storage (not represented) where data representative of an immersive video are stored, said local storage may be in the computer 4000 or in a local server accessible through a local area network for instance (not represented).

This system may also include one or more sensors 2000 and one or more user input devices 3000. The immersive wall 1000 may be an OLED or LCD type and may be equipped with one or more cameras. The immersive wall 1000 may process data received from the more or more sensors 2000. The data received from the sensor(s) 2000 may, for example, be related to lighting conditions, temperature, environment of the user, such as for instance, position of objects.

The immersive wall 1000 may also process data received from the one or more user input devices 3000. The user input device(s) 3000 may send data such as haptic signals in order to give feedback on the user emotions. Examples of user input devices 3000 include for example handheld devices such as smartphones, remote controls, and devices with gyroscope functions.

Data may also be transmitted from sensor(s) 2000 and user input device(s) 3000 data to the computer 4000. The computer 4000 may process the video data (e.g. decoding them and preparing them for display) according to the data received from these sensors/user input devices. The sensors signals may be received through a communication interface of the immersive wall. This communication interface may be of Bluetooth type, of WIFI type or any other type of connection, preferentially wireless but may also be a wired connection.

Computer 4000 sends the processed data and, optionally, control commands to the immersive wall 1000. The computer 4000 is configured to process the data, for example prepare the data for display by the immersive wall 1000. Processing may be done exclusively by the computer 4000 or part of the processing may be done by the computer 4000 and part by the immersive wall 1000.

FIG. 8 schematically represents another embodiment of the second type of system. The system includes an immersive (projective) wall 6000 which is configured to process (for example decode and prepare data for display) and display the video content and further includes one or more sensors 2000, and one or more user input devices 3000.

The immersive wall 6000 receives immersive video data from the internet through a gateway 5000 or directly from internet. In another embodiment, the immersive video data are obtained by the immersive wall 6000 from a local storage (not represented) where the data representative of an immersive video are stored, said local storage may be in the immersive wall 6000 or in a local server accessible through a local area network for instance (not represented).

This system may also include one or more sensors 2000 and one or more user input devices 3000. The immersive wall 6000 may be of OLED or LCD type and be equipped with one or more cameras. The immersive wall 6000 may process data received from the sensor(s) 2000 (or the plurality of sensors 2000). The data received from the sensor(s) 2000 may for example be related to lighting conditions, temperature, environment of the user, such as position of objects.

The immersive wall 6000 may also process data received from the user input device(s) 3000. The user input device(s) 3000 send data such as haptic signals in order to give feedback on the user emotions. Examples of user input devices 3000 include for example handheld devices such as smartphones, remote controls, and devices with gyroscope functions.

The immersive wall 6000 may process the video data (e.g. decoding them and preparing them for display) according to the data received from the sensor(s)/user input device(s). The sensor signals may be received through a communication interface of the immersive wall. This communication interface may include a Bluetooth type, a WIFI type or any other type of wireless connection, or any type of wired connection. The immersive wall 6000 may include at least one communication interface to communicate with the sensor(s) and with the internet.

FIG. 9 illustrates another embodiment in which an immersive wall is used for gaming. One or more gaming consoles 7000 are connected, for example through a wireless interface to the immersive wall 6000. The immersive wall 6000 receives immersive video data from the internet through a gateway 5000 or directly from internet. In an alternative embodiment, the immersive video data are obtained by the immersive wall 6000 from a local storage (not represented) where the data representative of an immersive video are stored, said local storage may be in the immersive wall 6000 or in a local server accessible through a local area network for instance (not represented).

Gaming console 7000 sends instructions and user input parameters to the immersive wall 6000. Immersive wall 6000 processes the immersive video content, for example, according to input data received from sensor(s) 2000 and user input device(s) 3000 and gaming console(s) 7000 in order to prepare the content for display. The immersive wall 6000 may also include internal memory to store the content to be displayed.

In a VR or AR or other systems that deliver immersive user experiences, it is important for visual content to be combined with other sensory components including sensors to deliver an optimal result to the user. For example, surround sound and even certain chemicals used to mimic a sense of familiar smells can be used in conjunction with AR/VR wearables for this purpose. Replicating a sense of touch, however, is more complicated. In recent years a lot of research has been performed in providing haptic or kinesthetic communication, geared to provide an accompanying sense of touch with the image content that is provided to the user of AR/VR devices. Mechanical and electrical stimulation is both used to assist in the creation of virtual objects in a computer simulation. Force, vibrations and motions can be reproduced to enhance the control of virtual objects.

High fidelity haptic and proprioceptive feedback is an unsolved area for prior art in the VR/AR field. Currently the prior art technologies cannot realistically duplicate the sensations of actually holding or touching a physical object that is represented by the virtual image produced. While there are some vibrotactile devices that can create feedback, most these devices lack proprioceptive feedback that can match with the virtual content being produced. Wearable devices present other problems. For example, consider a wearable device that can be worn like a glove. These gloves provide proprioceptive feedback but only for individual fingers. Therefore, most these devices leave areas that are not between hands uncovered. Other prior art devices exist that are anchored to the environment (like the phantom force feedback device) but these limitations are obvious.

Figure 13:
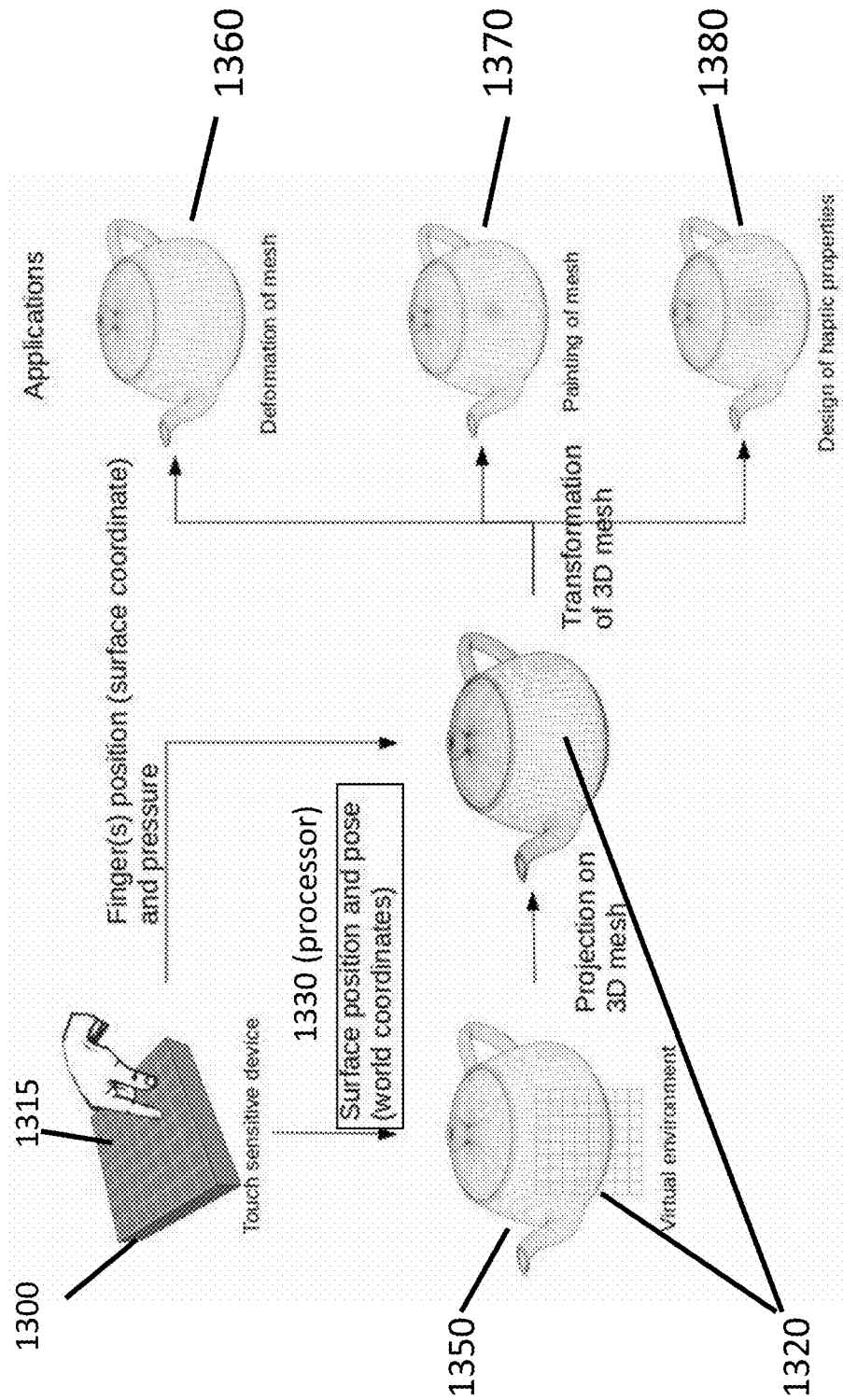
Figure 17:
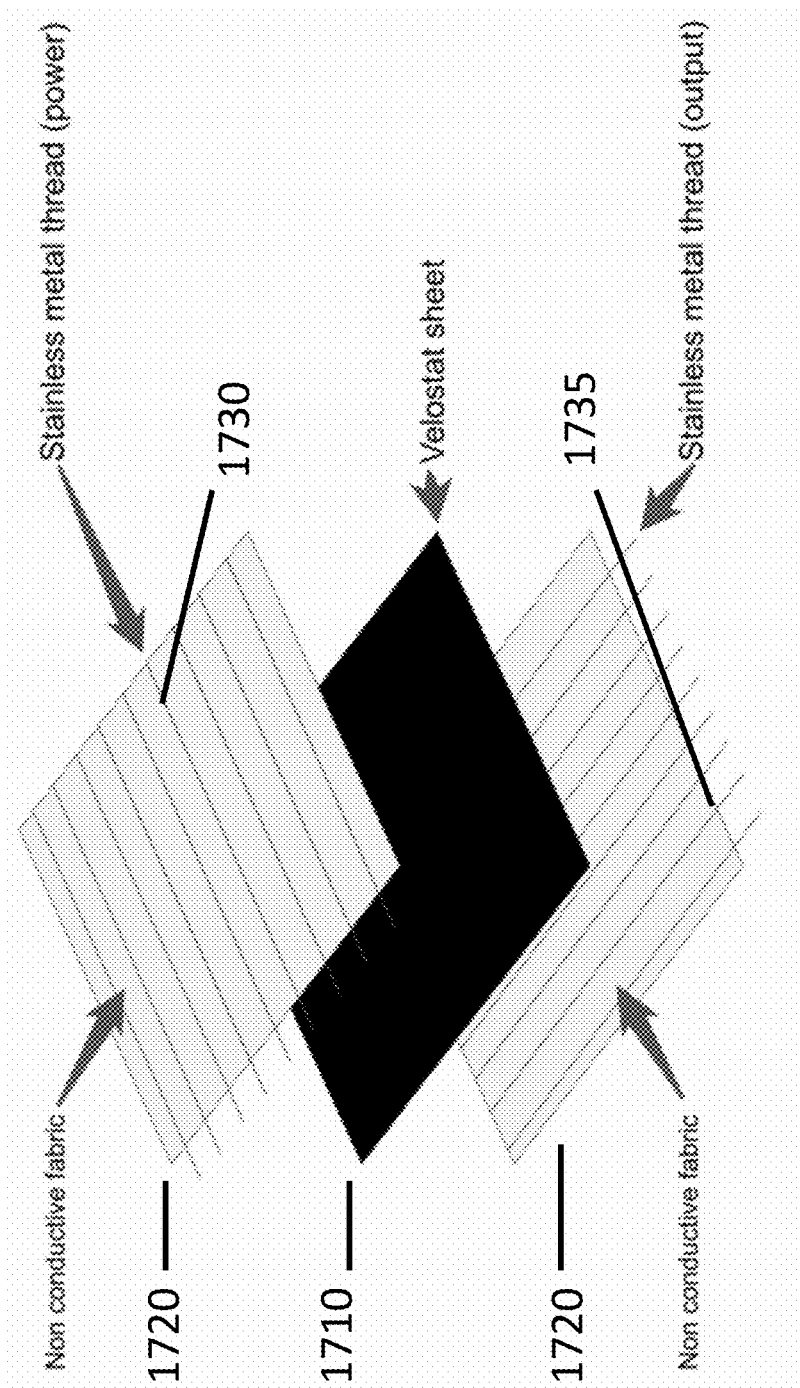
FIG. 17 is an illustration of a surface or a user interface electromechanical device with orthogonal conductive layers according to one embodiment.

FIG. 13, provides a system incorporating haptic technology. The system includes an electromechanical user input device 1300 as per one embodiment that is enabled to incorporate a realistic sense of touch corresponding to content provided by an immersive system. The device 1300 has a touch sensitive component 1315 as provided in embodiment of FIG. 13. This component can be responsive to input from a user which in the case of FIG. 13 corresponds to the position of the fingers and the pressure applied by each finger. In this embodiment, the device 1300 can also tracked other user input that may be provided in space in order to be represented in a virtual environment. In one embodiment, a plurality of pressure sensors can be provided in a configuration such as for example a matrix as shown in FIG. 17. In one embodiment, a XY touchpad device (in form of a mesh surface in this embodiment) that can provide a powered matrix can be used. The pressure applied to the matrix coordinates such as by a user will then be correlated to electrical signals and provided to a processor or computer. This will in turn controls the haptic effects.

Now referring back to FIG. 13, a number of arrangements can be provided to realistically represent a touch sensitive component. In the embodiment of FIG. 13, a virtual image which corresponds to the image representation of a teapot 1350 is projected on a display. A proxy image 1320 which appears in matrix format is then projected on the image 1350. The proxy corresponds to the touch sensitive surface which in this embodiment corresponds to a target mesh as referenced by numerals 1315. In other words, the proxy 1320 is the virtual representation of the touch sensitive device mesh 1315. The correspondence, or mapping, can be provided via a processor 1330 (which can be free standing, part of a computer or server or that of a smart phone, HMD or mobile device). As indicated, the portion of the teapot that is selected for touching will be referenced by the proxy (1320). The user input and any pressure applied, therefore is applied on the target mesh with the idea that pressure is virtually applied to the portion of the teapot shown by the proxy 1320. The manipulation of proxy will result in an output effect generated by the processor. In different alternate embodiments, manipulating the touch sensitive component of the device can provide different outcomes and different output effects. For example, applying the same pressure on the target mesh in one embodiment can deform the image of the teapot and the proxy as shown in 1360. In a different embodiment, the output effect can be pressure sensitive (different levels of pressure create different results) and the proxy can provide other effects. For example, as shown in 1370, the proxy can appear in color and different pressure levels can correspond to the intensity of the color. In other embodiments, applying surface properties can correspond to a feeling of applying pressure that corresponds to a coefficient of friction which can correspondingly provide a coordinated output to the proxy as shown by numerals 1380. It should be noted that once the pressure is applied and registered, a coordinated haptic effect (as discussed—i.e. 1360 to 1380) will be created such as through a coupled rendering device integrated into a processor/computer/mobile device/smart phone/HMD. In some embodiments, the haptic effect can be visual or can lead to further haptic results (pressure exerted back to the user). In addition, in some embodiments, the haptic effects may be in conjunction or trigger other multisensory results. For example, the tilting of the teapot may cause a temperature change to the fingers (hot tea) or sound of tea pouring or scent of tea being provided.

The embodiment of FIG. 13 is captured in the illustrative flowchart of FIG. 21. As can be seen, in FIG. 21 at 2100 an image is displayed to a user. A processor then registers in step 2110 location of a plurality of pressure sensors. In one embodiment, the pressure sensors are disposed in a configuration for example a matrix format on the surface of the electromechanical user input device. The processor also generates in step 2120, a proxy on the image having a plurality of points disposed in a matrix format. The proxy points are associated with each pressure sensor locations, or in case the resolution of the proxy and the device are not the same, a correspondence between the device sensors and the proxy points is available. The processor then generates in step 2130, an output effect responsive to input signal received from any of the pressure sensors of the electromechanical input device.

The embodiment of FIG. 13 is captured in the illustrative flowchart of FIG. 21. As can be seen, in FIG. 21 at 2100 an image is displayed to a user. A processor then registers in step 2110 location of a plurality of pressure sensors. In one embodiment, the pressure sensors are disposed in a matrix format on the surface of the electromechanical user input device. The processor also generates in step 2120, a proxy on the image having a plurality of points disposed in a matrix format. In one embodiment, the proxy resolution is not linked to the pressure sensor locations. A XY position on the electromechanical device is registered (Finger position on FIG. 13) by mixing pressure sensors values and reported on the proxy surface. In one embodiment, this step is independent from virtual proxy resolution.

Figure 15:
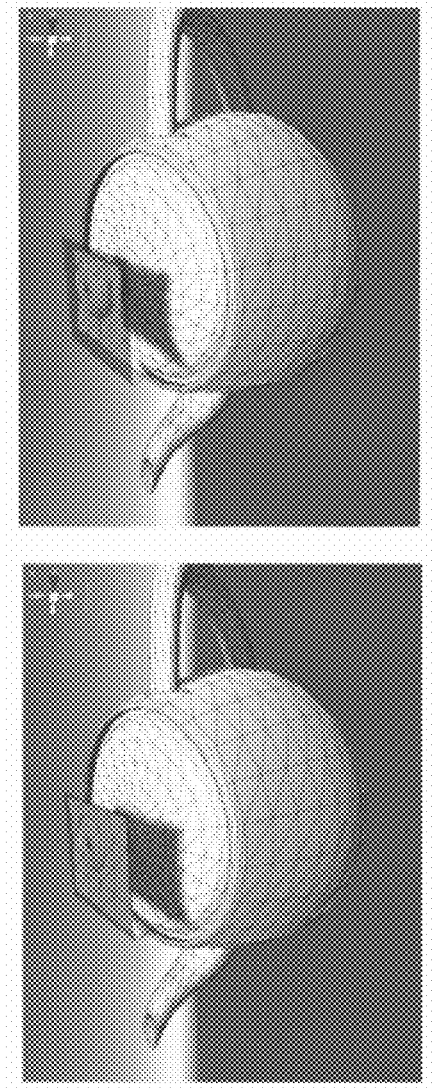
FIG. 15 is an illustration of a matching method for associating a proxy and an pressure sensors according to one embodiment.
Figure 16:
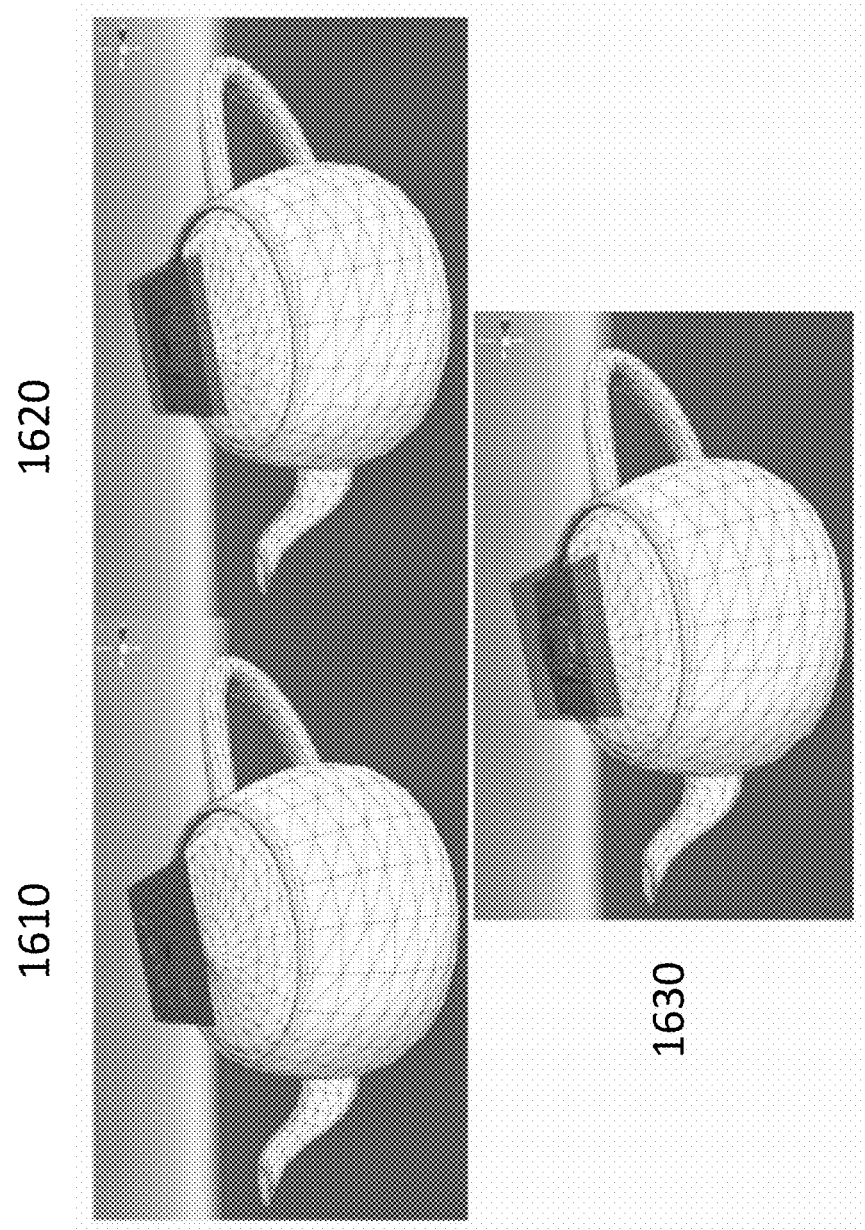
FIG. 16 is an illustration of an iterative matching process of image sensors and proxy images according to a different embodiment.

FIGS. 14 through 16 provides how the image representation can be used to achieve mapping. In FIG. 14, for ease of understanding, the example of FIG. 13 is used. In this example, a surface of the represented teapot is mapped onto the surface of the touch sensitive component 1315 (i.e. the mesh surface) to be manipulated. When the represented image and the surface of the touch sensitive component and the mesh have the same shape, this will be a relatively simple task, especially if the image is that of a two-dimensional object. However, when the two surfaces or shapes differ, a mapping needs to be performed. Such is the case in this example, as the tea pot is a three-dimensional object that does not correspond with the shape of a rectangular touch sensitive component 1310 even if the component is deformable and can provide some level of three dimensionality in some embodiments. In addition, the shape needs to become haptically sufficiently explicit to allow the user to believe that the object that is being manipulated is a tea pot that corresponds to the image being projected.

To provide such mapping, in one embodiment, the touch component or in this example the target mesh is manipulated through a proxy or a 3D representation of the teapot mapped onto the target mesh. In FIG. 14, a section of the teapot that is being manipulated is selected. For example, in FIG. 14, at 1400, a side of the teapot is selected while in 1410 a top portion of the teapot is selected. To provide a haptically correct representation, in one embodiment, in a first step, the proxy image and its location is aligned to the touch component or the mesh that is to be manipulated (the teapot here). Here the proxy is aligned in a way that the vertex at its center is located at the position of the closest vertex of the target mesh. The proxy is also rotated in a way that the normal of its central vertex is aligned to the normal of the target vertex. Referring back to 1400 and 1410, in representation of 1410, the proxy is aligned to the side of the teapot while in the representation of 1410, the proxy is aligned to the top of the teapot.

In FIG. 15, a subsequent step is illustrated where each vertex of the proxy casts a ray along its normal in direction of the target mesh. In this embodiment, the proxy is aligned again with the top portion of the teapot. If the ray hits a part of the target mesh, the vertex moves along the ray towards the vertex. Each iteration moves the vertices a quarter of the way through the Euclidian distance between the proxy vertex and the ray hit point on the target mesh, getting the now deformed proxy closer to the target mesh on each step. Two such steps are shown by numerals 1510 and 1520 for ease of understanding.

In FIG. 16, the proxy is mapped onto the top of the teapot (transparent light gray shape being the original shape). On the top left iteration referenced by numerals 1610, the proxy is just placed onto the top of the teapot. While on the right portion referenced by numerals 1620, the same is shown after one iteration has been performed. The second iteration is shown on the bottom center as referenced by numerals 1630 (after a second iteration). The higher number of iterations the more the proxy is shaped like the target mesh.

In different embodiments, if desired, some level of constraints can be added for better control over the deforming component. For example, in one embodiment, when the distance between proxy and target mesh is too high, if the angle between the proxy and the hit surface is too wide or if proxy vertices happen to be inside a closed target mesh, the mapping will not be performed. In such a case, the user will be provided alternate instructions to remedy the situation.

It should also be noted that in one embodiment, once the proxy aligned to the mesh, the user can lock the alignment. In this embodiment, locking the alignment will allow the tasks of aligning the proxy on the mesh and that of manipulating the mesh to become separated.

In different alternative embodiments, the shape of the device can be varied. Therefore, while a rectangular shape is shown for ease of understanding in embodiments of FIGS. 13 to 16, the shape of the mesh or even the shape of the proxy or the actual represented image does not have to be limited even to a planar surface and any surface even one that is irregular as well as spherical or half-spherical can be handled.

Figure 18:
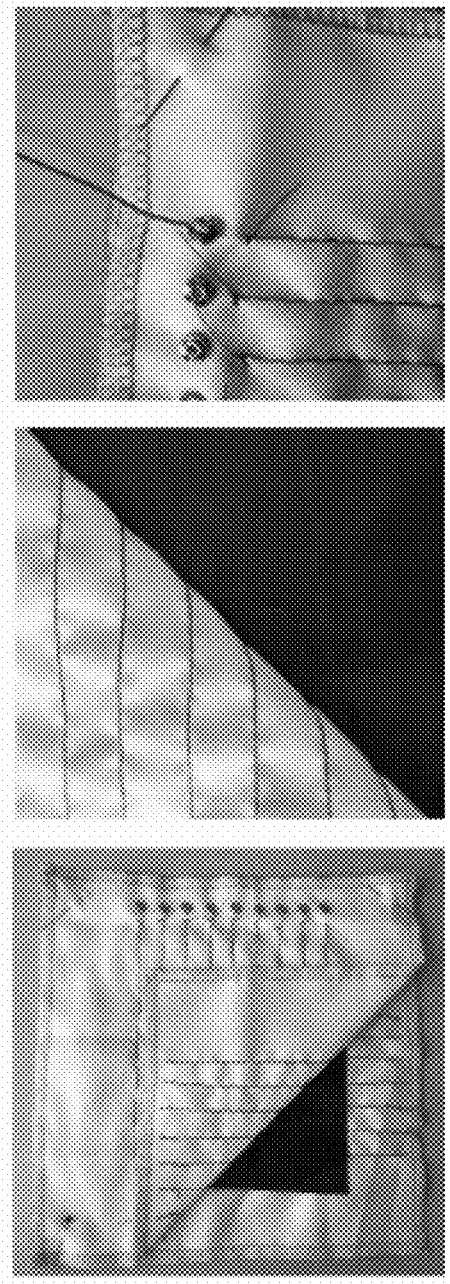
FIG. 18 schematically represents an example of a prototype as per embodiment of FIG. 17.
Figure 19:
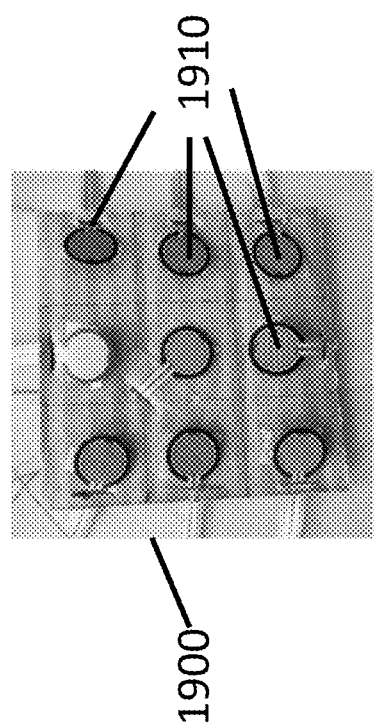
FIG. 19 is an illustration a surface of a user interface electromechanical device with a matrix format according to one embodiment.

The touch sensitive component 1300 can also be manufactured in a variety of manners ranging from the most simple, to the very sophisticated. In FIGS. 17 to 19, a variety of different alternatives are discussed for convenience with the understanding that many other alternatives are possible as can be appreciated to those skilled in the art.

In FIG. 17, as discussed earlier, in one embodiment, a XY touchpad device with pressure sensing abilities is provided that can use a mesh or an XY touchpad device to provide a powered matrix that correlate user applied pressure to electrical signals that will be later provided to a processor or computer to in turn create and control haptic output effects. In the example of FIG. 17, a various set of pressure sensitive materials can be incorporated with as few as a single sensor. In this way, a wide range of pressure values can be provided that can provide for a 2-superposed matrix architecture. The top layer will handle light pressure and touch and the bottom layer will handle middle and intense pressure. A microcontroller handles data collection and connection with a PC.

In the embodiment shown, top layer 1710 can be made of a pressure sensitive sheet. A number of pressure sensors can be used. For example, in one embodiment, a Velostat sensor can be placed between other sheets 1720 that can have some form of conductivity provided in them. For example, in one embodiment, the two other sheets can be made of cotton fabrics with conductive thread sewed into it. In one embodiment, a matrix arrangement is provided. In the case of the example discussed, the threads of a same piece of fabric can be placed orthogonally, as shown by numerals 1730 and 1735, to the other ones in order to create a matrix of rows and columns. Consequently, by providing voltage and powering independently each column and scanning the lines, these voltages can be measures and correlated to the pressure applied on each cell.

The final result is shown in an example as provided by FIG. 18. In FIG. 18, a sensor matrix of 9 cm by 9 cm was fitted into a 10 cm per 10 cm square. Narrow metal thread conductors were sewed into the fabric to provide the location matrix shown at 1810. A closeup of the pressure sensitive (Velostat) sheet and the fabric underneath is shown at 1820 and 1830. For a stronger pressure matrix, stronger pressure sensor components are used. (For example, force sensitive resistor FSR can be substituted for Velostat). A stronger pressure sensor component will allow generating a matrix that can register a global pressure value whatever the position of the finger is located.

Another example is provided in FIG. 19 where a stronger sensor is disposed on a surface (as opposed to the thread orthogonal design of FIG. 17). In this embodiment, a plurality of sensors is used to establish a matrix. A very simple design is provided in FIG. 19 that is comprised of a sheet of paper such as cardboard and nine FSRs (1910) that are attached to the cardboard (1900) mostly for support. This design provides a solid base to the prototype. Putting a rigid material allows a uniform global response all over the surface of the matrix.

Figure 20:
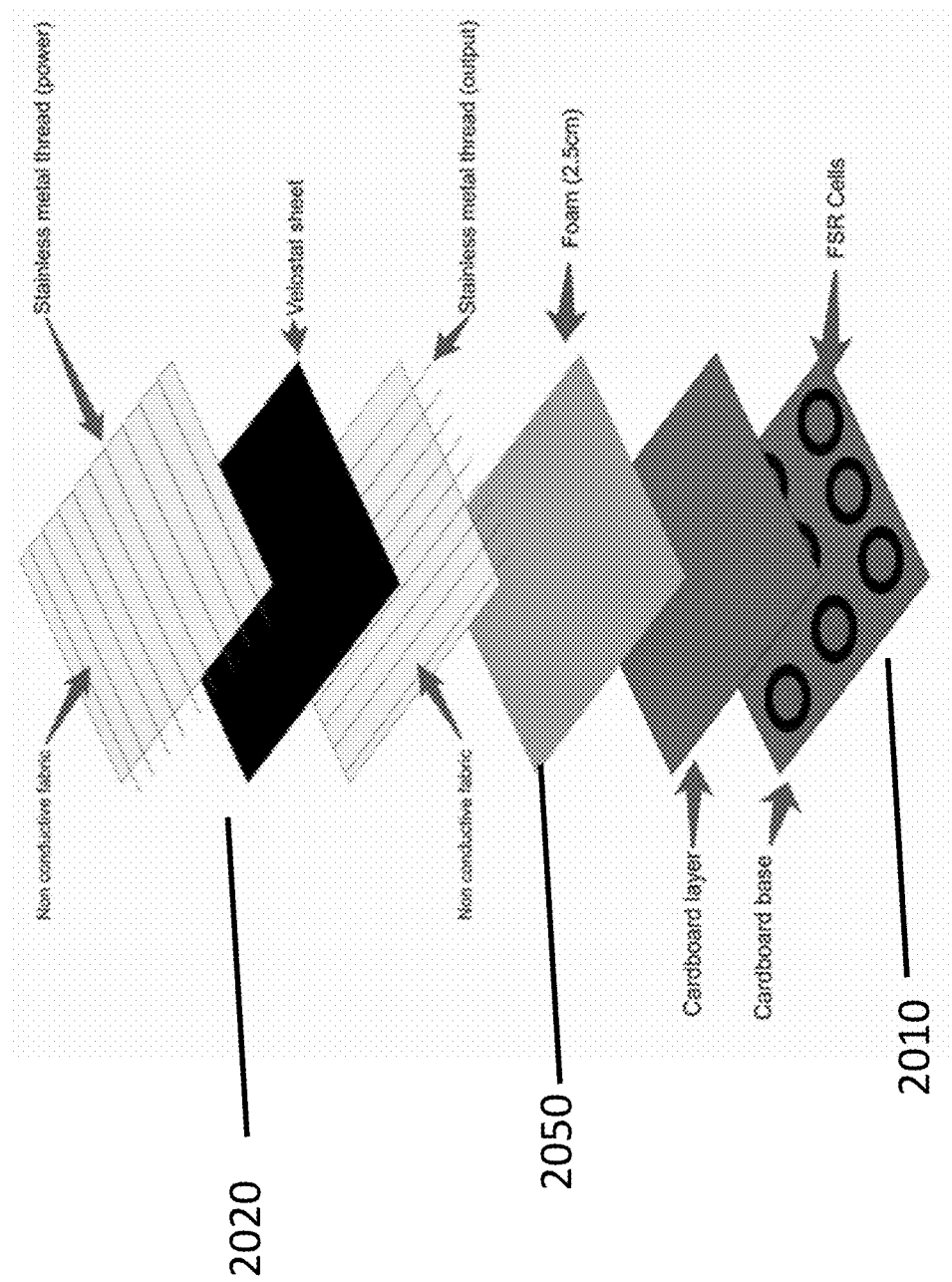
FIG. 20 is an illustration of a surface or a user interface electromechanical device with multilayered architecture according to one embodiment.

The embodiments of FIGS. 17/18 and 19 can also be further combined to provide for a more robust result. As shown in FIG. 20, the matrix design 2020 of FIGS. 17/18 is disposed over the matrix design 2010 of FIG. 19. Between the two matrices, a new layer 2050 (a polyurethane foam, in this example) can be used in one embodiment in order to provide a physical feedback to the user as pressure is applied through touching and pressing the device. The transmission of pressure data to a processor such as in a computer can be handled in a number of ways known to those skilled in the art (such as through a USB serial in form of Open Sound Control or OSC messages). Filtering and mapping of data is handled by a processor enabled to provide processing sketch, for example. In one embodiment, when the multi matrix devices are used such as in FIG. 20, a microcontroller and multiplexers can be further used to scan data. In this case, the touch sensitive device can be also coupled with a standard VR tracker to register its position in a three-dimensional space. This will also allow the overall system to be scalable as software handles different matrix sizes in the limit of available multiplexer and microcontroller pins.

Embodiments described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

While some embodiments have been described, it will be understood that those skilled in the art, both now and in the future, may make various improvements and enhancements which fall within the scope of the claims which follow.

The invention claimed is:

1. A method comprising:
generating, on an image for display to a user, a proxy having a plurality of points disposed in a configuration such that the proxy points correspond to locations of pressure sensors on an input device; and wherein a processor map the pressure sensors disposed in a two-dimensional configuration to correspond to the displayed image of a three-dimensional object;
generating an output responsive to an input signal received from one or more of the pressure sensors of the input device.

2. The method of claim 1, wherein a vertex of the proxy at its center is located at the position of a closest vertex of the deformable mesh.

3. The method of claim 2, wherein the proxy is rotated so that the normal of a central vertex of the proxy is aligned to the normal of a vertex of the deformable mesh.

4. The method of claim 3, wherein each vertex of the proxy casts a ray along its normal in direction associated with that of the deformable mesh.

5. The method of claim 4, wherein a plurality of iterations is calculated and each iteration moves the vertices of the proxy and the deformable mesh at least a quarter of the way through a Euclidian distance between the proxy vertex and the ray hit point on the deformable mesh.

6. The method of claim 5, wherein the pressure sensors are provided on at least one surface forming a deformable mesh.

7. An apparatus, comprising:
a processor configured for generating, on an image for display to a user, a proxy having a plurality of points disposed in a configuration such that the proxy points correspond to locations of pressure sensors disposed on an input device; said processor also generating an output responsive to an input signal received from one or more of the pressure sensors of the input device; wherein the processor map the pressure sensors disposed in a two-dimensional configuration to correspond to the displayed image of a three-dimensional object.

8. The apparatus of claim 7, wherein the pressure sensors are provided on at least one surface forming a deformable mesh.

9. The apparatus of claim 7, wherein the pressure sensors are haptic actuators enabled to receive a plurality of pressure levels.

10. The apparatus of claim 9, wherein the output effect changes according to pressure levels received.

11. The apparatus of claim 7, wherein the output effect includes changes to the image displayed.

12. The apparatus of claim 7, wherein the output effect includes a haptic feedback send to the user via the input device.

13. The apparatus of claim 7, wherein a vertex of the proxy at its center is located at the position of a closest vertex of the deformable mesh.

14. The apparatus of claim 13, wherein the proxy is rotated so that the normal of a central vertex of the proxy is aligned to the normal of a vertex of the deformable mesh.

15. The apparatus of claim 14, wherein each vertex of the proxy casts a ray along its normal in direction associated with that of the deformable mesh.

16. The apparatus of claim 15, wherein a plurality of iterations is calculated and each iteration moves the vertices of the proxy and the deformable mesh at least a quarter of the way through a Euclidian distance between the proxy vertex and the ray hit point on the deformable mesh.

17. A system comprising
an apparatus according to claim 7; and at least one of
an input device having a plurality of pressure sensors disposed in a configuration and a display for displaying the image; wherein the input device comprises a first structure including:
a first and second sheet with interspersed conductive threads and disposed over one another such that said first and second interspersed conductive threads are disposed orthogonally to one another; and
a pressure sensitive sheet disposed between the first and the second sheet.

* * * * *